United States Patent Office 3,350,323
Patented Oct. 31, 1967

3,350,323
CATALYST PRODUCTION
John M. Willatt and Gregor H. Riesser, Pasadena, Tex., assignors to Shell Oil Company, New York, N.Y., a corporation of Delaware
No Drawing. Filed Sept. 17, 1964, Ser. No. 397,315
9 Claims. (Cl. 252—456)

ABSTRACT OF THE DISCLOSURE

Bismuth-containing oxidation catalysts are produced by preparing a clear homogeneous aqueous solution consisting of dissolved soluble compounds of a water-soluble base, e.g., ammonia; bismuth; a water-soluble aliphatic hydroxycarboxylic acid of 3 to 6 carbon atoms, e.g., citric or tartaric acid; and molybdic acid, tungstic acid, and/or chromic acid; producing a solid bismuth product therefrom by removing water, and calcining the resulting solid. The catalysts, so homogeneously solubilized as hydroxycarboxylates in basic solution, can be deposited in uniform distribution upon catalyst supports.

---

This invention relates to a method of producing bismuth-containing catalysts employed in oxidative conversion processes and relates more particularly to the production of supported bismuth-containing, oxidative conversion catalysts.

Catalysts containing bismuth as an essential component, to the production of which the present invention is directed, find application broadly in processes involving the oxidative conversion of organic compounds. Processes directed to the oxidative conversion of hydrocarbons with the aid of bismuth-containing catalysts comprise: (1) the oxidative dehydrogenation of olefinic hydrocarbons to less saturated hydrocarbons, for example, in the presence of a bismuth molybdate catalyst as described in U.S. 2,991,320, issued July 4, 1961, to G. W. Hearne et al., or in the presence of a bismuth tungstate catalyst as described in U.S. 2,991,322, issued July 4, 1961, to W. E. Armstrong et al., or a bismuth phosphate catalyst as described in U.S. 2,991,321, issued July 4, 1961, to H. H. Voge et al.; (2) the incomplete oxidation of olefins to unsaturated aldehydes in the presence of a bismuth molybdate or bismuth phosphomolybdate catalyst as described in U.S. 2,941,007, issued June 14, 1960, to J. L. Callahan et al.; and (3) the reaction of olefins with oxygen and ammonia in the presence of bismuth-containing catalysts, for example, as described in Belgian Patent 598,511, applied for by Knapsack-Griesheim A.G. on December 23, 1960.

However, the practical application of these bismuth-containing catalysts, and particularly of bismuth molybdate, to commercial processes has been handicapped by difficulties inherent in methods of producing these catalysts as disclosed heretofore. It is sometimes desirable and often essential that the bismuth-containing catalysts be supported upon an inert carrier. Desirable supported bismuth-containing catalysts consisting essentially of catalyst deposited uniformly upon the inert carrier have been difficult to obtain owing to the low solubility of the bismuth-containing catalysts in general.

An object of this invention is to provide an improved method for producing bismuth-containing catalysts. Another object is to furnish an improved method for producing catalysts comprising bismuth in combination with a metal of the left-hand column of Group VI of the Periodic Table of the Elements and oxygen. Still another object is to provide a method for producing a clear homogeneous solution of catalysts employed in the oxidative conversion of hydrocarbons consisting essentially of bismuth in combination with molybdenum and oxygen. A more particular object is to provide an improved method for producing more efficiently a supported bismuth molybdate catalyst employed in the oxidative conversion of hydrocarbons consisting essentially of bismuth molybdate deposited in a uniform manner upon an inert carrier.

In accordance with the present invention valuable bismuth-containing catalysts useful in the oxidative conversion of hydrocarbons are produced by preparing an aqueous solution consisting essentially of dissolved soluble compounds of a water-soluble base, e.g., ammonia; bismuth; a water-soluble aliphatic hydroxypolycarboxylic acid of 3 to 6 carbons containing only carbon, hydrogen, and oxygen atoms and only hydroxylic and carboxylic functional groups; and molybdic acid, tungstic acid, and/or chromic acid; producing a solid bismuth product therefrom by removing water, and calcining the resulting solid.

Representative aliphatic hydroxypolycarboxylic acids include citric acid, tartaric acid, tartronic acid, ribosic acid, saccharic acid, and the like. Of these, citric acid and tartaric acid are preferred.

A preferred way in which to attain the aforesaid desired aqueous solution is to contact in a dilute basic medium, such as an aqueous ammoniacal medium, a specific bismuth salt, namely bismuth citrate or bismuth tartrate, and an inorganic acid such as molybdic acid, tungstic acid, or chromic acid. Of the inorganic acids, molybdic acid is the most preferred. Alternatively, the aforementioned aqueous solution may be obtained by contacting in an aqueous medium ammonium salts of all the other constituents, for example, by dissolving directly in water bismuth ammonium citrate together with ammonium molybdate, ammonium tungstate, or ammonium chromate. Another way in which the solution may be obtained is to introduce soluble sodium or potassium salts of all the other constituents to the aqueous medium. Useful in this connection are the water-soluble bismuth sodium tartrate, bismuth potassium tartrate, sodium molybdate, sodium tungstate, potassium molybdate, etc. After removal of water and after calcination, the final traces of sodium or potassium may be removed by suitable methods, such as leaching and the like. A final drying then yields the desired solid bismuth catalyst.

In the most preferred form of the invention, bismuth citrate or bismuth tartrate and molybdic acid are dissolved in dilute ammonium hydroxide which may conveniently contain from about 1 to about 10% by weight of ammonia to produce a clear, homogeneous solution of bismuth molybdate. Optionally, if conditions warrant, the solution may be clarified at this stage by standard methods, such as filtration and the like. A solid bismuth product may then be obtained by removing water from the solution, e.g., by evaporating to dryness, and the resulting solid calcined at an elevated temperature, for example, in the range of from about 300 to about 600° C., preferably in the region of from about 450 to about 500° C., to obtain the desired bismuth molybdate catalyst. The calcination may be carried out in air or in an atmosphere consisting, at least in part, of such normally gaseous media as nitrogen, flue gas, steam, and the like.

In addition, this invention provides an improved method for producing a supported catalyst by depositing the bismuth molybdate from the homogeneous citrate or tartrate solution in uniform distribution upon an inert carrier. For this purpose, a particulate inert carrier can be immersed in the clear, homogeneous solution consisting essentially of dissolved soluble compounds of ammonia, bismuth, citric or tartaric acid, and molybdic acid. Agitation is beneficial to insure complete contact of the liquid and solid phases. The excess liquid portion of the twophase mixture is then removed, for example, by decantation or by evaporation to dryness. The residual impregnated support is calcined at an elevated temperature, for example, in the range of from about 300° to about 600° C., preferably in the region of from about 450 to about 500° C., for several hours to yield the desired uniformly dispersed, supported catalyst. The calcination may be carried out in the gaseous media mentioned previously.

Suitable finely divided, solid support materials which may be used comprise, for instance, silica in its various modifications, including silica gel, silicates, and the like; fuller's earth, pumice, kieselguhr, clays, mica, zeolites, porcelain and other refractory material, alumina, bauxite, thoria, beryllia, magnesia, magnesite, cerium oxide, titanium oxide, silicon carbide, zirconia, asbestos, graphite, etc. Of these, the most preferred are silica and zirconia. The uniformly dispersed, supported bismuth molybdate catalysts obtained in accordance with the methods of this invention are particularly valuable for use in commercial processes due to their increased ruggedness, uniformity of composition, longer catalyst life and lower cost. The impregnation of carriers with bismuth molybdate by methods disclosed heretofore relying upon precipitation from solutions of bismuth nitrate is difficult due at least in part to the unavoidable immediate precipitation of bismuth molybdate upon the addition of molybdic acid and generally results in catalysts poorly supported, lacking in uniformity of composition and possessing inferior physical properties.

The following example is illustrative of the invention.

EXAMPLE 1

In 80 grams of concentrated aqueous ammonium hydroxide (28% wt. $NH_3$) and water was dissolved 100 grams of bismuth citrate, the final volume of this solution (A) being adjusted to 500 ml. by the addition of more water. In 40 grams of concentrated ammonium hydroxide (28% wt. $NH_3$) and water was dissolved 42.6 grams of molybdic acid, the final volume of this solution (B) being adjusted to 250 ml. by the addition of more water. Mixing 26.4 ml. of solution (A) with 13.2 ml. of solution (B) yielded a clear, homogeneous solution of bismuth molybdate. This solution was poured over 20 grams of 20–30 mesh zirconia (in the form of Zirconia LZ–700, Norton Company) contained in a round-bottom flask. The flask was placed under reduced pressure and rotated over a steam bath. After the liquid phase had been evaported to dryness, the resulting solid phase was calcined at 450° C. for four hours to yield the desired uniformly dispersed, supported bismuth molybdate.

Three milliliters of catalyst so prepared was placed in the central zone of a tubular 10-ml., 1-cm. I.D. glass reactor enclosed in a furnace heated to 498° C. Small glass beads were used to fill the space on either side of the catalyst. A mixture consisting of 91% propylene and 6.2% oxygen was passed over the catalyst bed at a temperature of 500° C. at a rate of 150 ml. per minute, equivalent to a gas hourly space velocity of 3,000. Analysis of the exit gases by mass spectrometry and gas-liquid chromatography indicated that 100% of the oxygen was converted with a selectivity to acrolein (based on propylene) of 67.6% and a selectivity to carbon dioxide (based on propylene) of 17.1%.

The invention described herein is applicable to the production of supported bismuth molybdate catalysts broadly. It is particularly applicable to the production of improved supported bismuth molybdate catalysts containing supplementary elements present for the purpose of modifying catalytic activity such, for example, as copper, phosphorus, silicon, sulfur, iron, tin, lead, arsenic, antimony, silver, tellurium, cobalt, and the like. One such catalyst which is highly preferred is an improved supported bismuth molybdate catalyst having copper incorporated therein. The incorporation of copper may be effected by impregnating the supported bismuth molybdate already described herein with aqueous solutions of a copper salt, such as cupric acetate, cupric nitrate and the like, drying, and calcining at a temperature in the range of from about 300 to about 600° C. Alternatively, the copper may be incorporated during the production of the catalyst by combining the copper component, for example, as a salt, such as cupric acetate, cupric nitrate and the like, in the initial bismuth citrate- or tartrate-molybdic acid ammoniacal solution. The preferred copper content ranges from about 0.1 to about 3.0% wt. copper based on the weight of the support; an especially advantageous supported modified bismuth molybdate catalyst is that having from about 0.25 to about 0.5% wt. copper based on the weight of the support.

The following example illustrates advantages of the copper-modified supported bismuth molybdate catalysts produced by the methods of this invention. When used in the incomplete oxidation of olefins to unsaturated aldehydes, these modified catalysts enable the attainment of high conversions of oxygen, high selectivily to unsaturated aldehyde, e.g., acrolein, and an exceptionally low selectivity to undesired by-product carbon dioxide.

EXAMPLE 2

A clear, homogeneous solution of bismuth molybdate was prepared by mixing 26.4 ml. of bismuth citrate solution (A) Example 1 with 13.2 ml. of molybdic acid solution (B) of Example 1. In the resulting bismuth molybdate solution was dissolved 0.314 gram of cupric nitrate. Twenty grams of 20–30 mesh zirconia (in the form of Zirconia LZ–700, Norton Company) was impregnated with the copper-containing bismuth molybdate solution by placing the liquid and solid ingredients in a round-bottom flask, reducing the pressure, and rotating over a steam bath. After the liquid phase was evaporated to dryness, the resulting solid phase was calcined at 450° C. for four hours to yield the desired uniformly dispersed, copper-incorporated supported bismuth molybdate.

Three milliliters of this catalyst was utilized in the oxidation of propylene to acrolein, the process first described in Example 1, to yield the following data and results:

| Furnace Temp., ° C. | Maximum Temp. in Catalyst Bed, ° C. | Oxygen Conversion, percent | Selectivity (based on propylene) to— | |
|---|---|---|---|---|
| | | | Acrolein, percent | Carbon Dioxide, percent |
| 399 | 432 | 97.3 | 79 | 6 |
| 448 | 486 | 100 | 78 | 7 |

We claim as our invention:

1. The method of producing a bismuth-containing catalyst useful in the oxidative conversion of hydrocarbons which comprises preparing an aqueous solution consisting essentially of dissolved soluble compounds of (a) a water-soluble base, (b) bismuth, (c) a water-soluble, aliphatic hydroxypolycarboxylic acid of 3 to 6 carbons containing only carbon, hydrogen, and oxygen atoms and only hydroxylic and carboxylic functional groups, and (d) an inorganic acid selected from the group consisting of molybdic acid, tungstic acid, and chromic acid, producing a solid bismuth product therefrom by removing water, and calcining the resulting solid.

2. The method in accordance with claim 1 wherein said water-soluble base is ammonia.

3. The method in accordance with claim 1 wherein said aliphatic hydroxypolycarboxylic acid is citric acid.

4. The method in accordance with claim 1 wherein said aliphatic hydroxypolycarboxylic acid is tartaric acid.

5. The method of producing bismuth molybdate catalyst which comprises contacting bismuth tartrate and molybdic acid in a dilute aqueous ammoniacal medium, removing water, and calcining at a temperature of from about 300 to about 600° C.

6. The method of producing bismuth molybdate catalyst which comprises contacting bismuth citrate and molybdic acid in a dilute aqueous ammoniacal medium, removing water, and calcining at a temperature of from about 300 to about 600° C.

7. The method in accordance with claim 6 wherein said bismuth molybdate catalyst is supported in uniform distribution on an inert carrier chosen from the group consisting of silica and zirconia.

8. The method in accordance with claim 7 wherein said bismuth molybdate catalyst additionally contains copper in an amount of from about 0.1 to about 3 percent by weight of the inert carrier.

9. The method in accordance with claim 7 wherein said bismuth molybdate catalyst additionally contains copper in an amount of from about 0.25 to about 0.5 percent by weight of the inert carrier.

References Cited

UNITED STATES PATENTS

| | | | |
|---|---|---|---|
| 2,065,394 | 12/1936 | Punnett | 252—456 X |
| 2,871,273 | 1/1959 | Behn | 252—456 X |
| 2,984,653 | 5/1961 | Witt | 252—458 X |
| 2,991,322 | 7/1961 | Armstrong et al. | 252—456 X |
| 3,200,141 | 8/1965 | Milberger | 252—458 X |
| 3,282,860 | 11/1966 | McDaniel et al. | 252—456 X |

DANIEL E. WYMAN, *Primary Examiner.*

C. F. DEES, *Assistant Examiner.*